March 8, 1949.  A. RASPET  2,464,185
TRAILING SKID VANE
Filed June 22, 1946
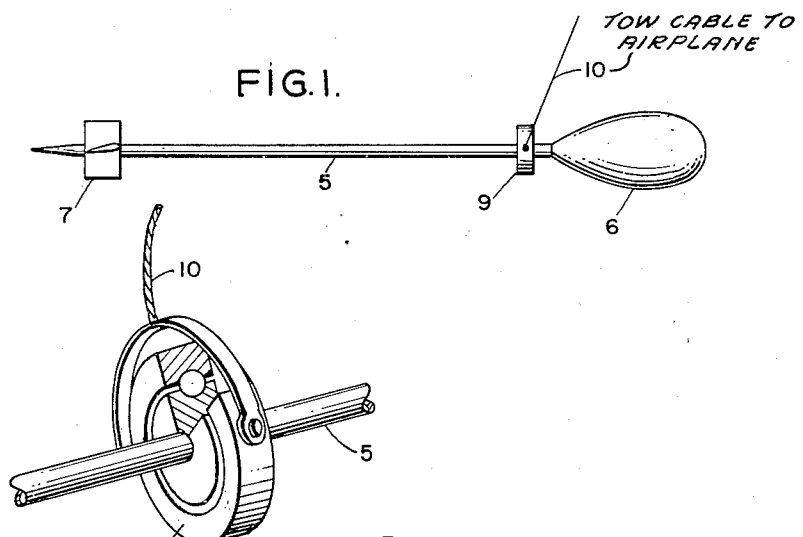
FIG. 1.
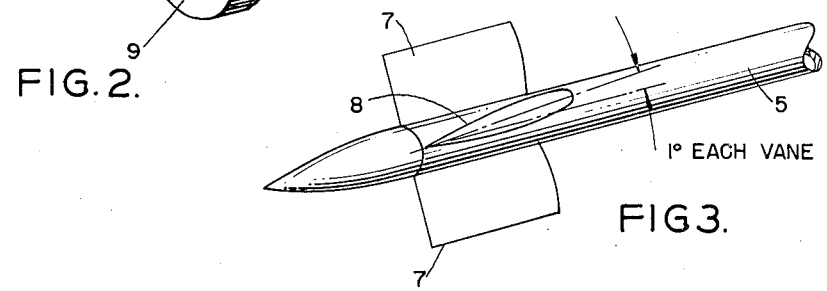
FIG. 2.
FIG. 3.
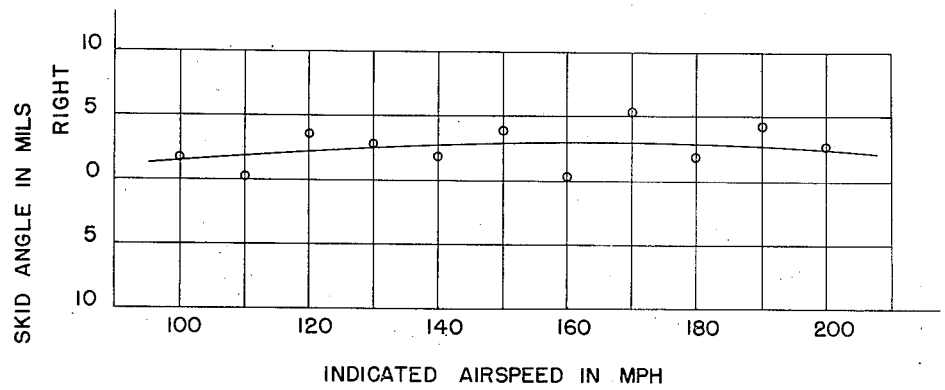
FIG. 4.
INVENTOR.
AUGUST RASPET Patented Mar. 8, 1949

2,464,185

UNITED STATES PATENT OFFICE 2,464,185

TRAILING SKID VANE

August Raspet, Locust Valley, N. Y., assignor to Specialties, Inc.

Application June 22, 1946, Serial No. 678,697

3 Claims. (Cl. 73—188)

1

The present invention has for an object to provide an improved trailing skid vane or trailing bomb which when towed from an airplane, will provide an accurate line of reference parallel to the true line of flight.

In flight testing aircraft it is necessary accurately to ascertain the attitude of the aircraft with respect to its flight path. If the angle between the longitudinal axis and the true flight path is measured in the plane of the longitudinal and lateral axes of the airplane, the value of the true aerodynamic skid is obtained. In order to obtain the angle of attack, measurement is made of the angle between the flight path and some fixed reference line of the aircraft in the plane of the longitudinal and vertical axes of the aircraft. One method of taking the measurements in order to obtain the true value of the aerodynamic skid and of the angle of attack involves towing a fin stabilized body or a trailing skid vane below the aircraft on a cable. The fin stabilized body is designed to be directionally stable and to travel as accurately as possible parallel to the line of flight while taking the direction of the line of flight. However, such a body has its axis tangent to the flight path only if the fins are absolutely parallel to the axis of the body. With the usual inaccuracies of fabrication, errors of alignment of the fins of the order of 1° may often be found. This introduces a greater error than is permissible in test work.

Customarily, a calibration in a wind tunnel is made to ascertain this error for each trailing skid vane and allowance for the error made in use. Alternatively, it is possible to compensate for the error of alignment by rotating the fin stabilized body through 180° after a first calibration on an aircraft has been obtained and then repeating the calibration. The two calibrations may then be compared and an average taken of the two sets of readings. This, in part, provides for a compensation for errors but still leaves some possibility of error. In this technique of reversal, it is necessary that the fins on the body remain fixed during the two sets of measurements if accuracy is to be obtained. Ground handling, temperature effects and aerodynamic loads may warp the fins so that the rigidity of the vanes or fins is not perfectly maintained even for the duration of a single flight test.

The present invention provides an improved trailing skid vane whose axis in operation always defines the true flight path. In order that this may be, provision is made for causing the body

2 to rotate on its axis as it is towed through the air. In other words, it is continually reversing both horizontally and vertically and therefore the errors of alignment are automatically averaged.

The measurements of the angles between the axis of the aircraft and the flight path are usually made by photographing the trailing skid vane from the aircraft from which it is towed or by photographing both the trailing vane and the aircraft being calibrated from a second aircraft. The camera may be so positioned in the aircraft that one side of the film is parallel to the flight axis of the aircraft. The angle between the fin stabilized body and the longitudinal axis of the aircraft may then be measured directly on the photographs.

The nature and objects of the invention will be better understood from a description of a particular, illustrative embodiment thereof for the purposes of which description reference should be had to the accompanying drawing forming a part hereof and in which:

Figure 1 is a side view of a trailing skid vane constructed in accordance with the invention.

Fig. 2 is a perspective and partly sectional view illustrating one form of anti-friction support for the skid vane.

Fig. 3 is a detail view of the fins and

Fig. 4 is a skid calibration curve for an airplane obtained by the use of a rotatable trailing skid vane of the type described herein.

Referring more particularly to the drawings, the device shown for the purposes of illustration of the principles of the invention comprises a relatively long, straight shaft 5 to the forward end of which is secured a streamlined mass 6 and to the rear end of which are secured two pairs of fins 7 and 8, preferably streamlined, at right angles to each other. The long shaft facilitates observation and measurement of the angles involved. This fin stabilized body is supported in an anti-friction bearing 9 carried by a cable 10 by which in use it is towed below an airplane. The cable is of sufficient length so that the trailing body will travel in air which is not substantially disturbed by the air flow about the aircraft.

The fins as best shown in Fig. 3 are twisted at a slight angle to the axis of the trailing vane in order to insure rotation. The fins constitute the part of the device most likely to be damaged and it is important that rotation of such part be provided. As shown, substantially the whole device rotates but the particular arrangement is not essential to accomplishing the objects of the invention. The rate of rotation of the spinning body on its axis should be at least as great as the natural frequency of the yawing oscillation of the body but obviously should not be so high that gyratory effects are produced. This frequency is given by the formula $$F = 2\frac{V_i}{2\pi}\sqrt{\frac{\rho \frac{dC_L}{d\phi} Sl}{2I}}$$

where $V_i$ is the indicated airspeed, $\rho$ is the density of the air, $\frac{dC_L}{d\phi}$ is the slope of the aerodynamic force curve of the fins, $S$ is the area of the fins, $l$ is the distance from the point of suspension to the center of pressure of the fins, $I$ is the moment of inertia of the body, $F$ being the frequency.

The frequency of yawing oscillation as also the rate of rotation is directly proportional to the airspeed so that once the pitch is set whereby the rate of rotation exceeds the yawing frequency of the device, this condition will be retained over a considerable speed range.

Figure 4 shows a typical series of observations indicating the lateral deviation of the direction of the airplane centre line relative to the direction indicated by the trailing vane. The observations were made by means of a sight having a reference line for viewing the trailing vane.

The foregoing particular description of a selected embodiment of the invention is illustrative merely and is not intended as defining the limits of the invention. Obviously, changes may be made without departing from the spirit of the invention while retaining some or all of the advantages of the preferred embodiment.

I claim:

1. A trailing vane of the character described adapted to be suspended by a cable from an aircraft in flight, comprising a relatively long shaft, a streamlined mass secured to the forward end of said shaft, streamlined fins secured to the rear end of said shaft, and formed to cause rotation of the trailing vane in flight, an anti-friction bearing supporting the trailing vane shaft at the center of gravity thereof for rotation, said anti-friction bearing being adapted to be secured to the cable.

2. A trailing vane of the character described adapted to be suspended at its center of gravity by a cable from an aircraft in flight comprising a body, fins secured at the rear end thereof and adapted to stabilize the body in flight and a bearing at the center of gravity of the body in which the body is rotatable on its longitudinal axis adapted to be connected to the cable, said fins being formed to cause rotation of the body at a rate in excess of its natural frequency of yawing oscillation when towed from an airplane at the speed at which it is designed to be used.

3. A trailing vane of the character described adapted to be suspended from an aircraft in flight to provide a directional line of reference comprising a cable, a long shaft, a streamlined mass secured to the forward end of the shaft, streamlined fins carried at the rear end of said shaft extending at an angle to the axis of the shaft, an anti-friction bearing positioned at a suitable point between the supporting cable and the fins to permit rotation of the fins during flight.

AUGUST RASPET.

REFERENCES CITED

The following references are of record in the file of this patent:

UNITED STATES PATENTS

| Number | Name | Date |
| --- | --- | --- |
| 183,559 | Haines | Oct. 24, 1876 |
| 384,362 | Haskell | June 12, 1888 |

FOREIGN PATENTS

| Number | Country | Date |
| --- | --- | --- |
| 340,532 | Germany | Nov. 15, 1919 |